United States Patent [19]
Sorensen et al.

[11] Patent Number: 4,555,393
[45] Date of Patent: Nov. 26, 1985

[54] METHOD FOR MAKING CARBON MICROFIBERS

[75] Inventors: Ian W. Sorensen; Robert S. Kiwak, both of Ellicott City, Md.

[73] Assignee: Bendix Corporation

[21] Appl. No.: 622,829

[22] Filed: Jun. 21, 1984

Related U.S. Application Data

[62] Division of Ser. No. 432,216, Oct. 1, 1982, Pat. No. 4,472,541.

[51] Int. Cl.$^4$ .......................... C01B 31/02; D01F 9/12
[52] U.S. Cl. .............................. 423/447.1; 423/447.2; 423/448; 423/460
[58] Field of Search .................. 423/447.1, 447.2, 448, 423/460; 106/307

[56] References Cited

U.S. PATENT DOCUMENTS 4,073,869  2/1978  Kalnin ............................ 423/447.1
4,269,876  5/1981  Lind et al. ......................... 427/309

OTHER PUBLICATIONS

Harris et al., "Journal of Material Science" vol. 4, 1969, pp. 432-438.
Donnet et al., "11th Biennial Conference on Carbon" Jun. 4-8, 1973, pp. 172-173.

Primary Examiner—Edward J. Meros
Attorney, Agent, or Firm—James R. Ignatowski; Russel C. Wells

[57] ABSTRACT

A continuous fiber composite having carbon microfibers dispersed in the resin filling the interstices between the continuous fibers to enhance the transverse properties of the composite. The carbon microfibers are made by soaking carbon fibers in an intercalating acid solution comprising a mixture of fuming nitric and sulfuric acid to weaken the intercrystallite bonds. Gentle stirring of solution separates the carbon microfibers from the host fibers. The microfibers are then separated from the intercalating acid solution and washed to remove the residual acid.

4 Claims, 3 Drawing Figures

Onset of fiber breakup after 30 minutes

Microfibers after 90 minutes

Electron microphotograph of fiber break up

METHOD FOR MAKING CARBON MICROFIBERS

This application is a division, of application Ser. No. 432,216, filed Oct. 1, 1982, now U.S. Pat. No. 4,472,541.

BACKGROUND OF THE INVENTION FIELD OF THE INVENTION

The invention is related to the field of fibrous composite materials and in particular to a method for making carbon microfibers for secondary matrix reinforcement of fibrous composites.

Prior Art

The use of fiber reinforced composite materials in the place of metals and ceramics has been rapidly increasing. Carbon fiber reinforced composites are currently receiving considerable attention because of their high strength to weight ratio, temperature resistance, corrosion resistance, impact strength, and other desirable properties. Workers in the field have been continuously working to improve the strength of the carbon fiber reinforced composites. The thrust of their efforts has been along two distinct paths. One has been to improve the strength and flexibility of the carbon fibers themselves as disclosed by Schulz in U.S. Pat. Nos. 4,138,525 and 4,014,725. The other has been directed to surface treating the fibers to improve the adhesion between the fibers and the resins. Typical of this latter thrust are the methods disclosed by Lind et al in U.S. Pat. No. 4,269,876, Kalnin in U.S. Pat. No. 4,073,869, Joo et al in U.S. Pat. No. 3,989,802 and others.

The physical properties of fiber reinforced composites along the fiber direction are quite good and satisfactory for many applications. In contrast however the physical properties of the fiber reinforced composites transverse to the fiber direction is relatively low when compared to those along the fiber direction. This is because the transverse behavior is matrix dominated. This deficiency may be partially rectified by fiber reinforcing the neat resin between the primary reinforcing fibers with transverse discontinuous fibers. This requires microfiber small enough to fit into the interstices between the primary fibers. Commercially available microfibers, such as Wollastonite or silicon carbide whiskers approach the desired size range. Wollastonite is a low cost mineral fiber with limited physical properties. In contrast silicon carbide whiskers have good physical properties but are very expensive. Therefore neither Wollastonite nor silicon carbide are well suited to interstitial reinforcement of continuous fiber composites. The Wollastonite fibers are relatively large and the aspect ratio of the silicon carbide whiskers is not sufficiently uniform.

The present invention describes a method for making carbon microfibers that have aspect ratios in the desired range and diameters sufficiently small to be used for the interstitial reinforcement of continuous fiber composites.

SUMMARY OF THE INVENTION

The invention is a method for secondary reinforcement of continuous fiber composites using carbon microfibers and a method for making the carbon microfibers. The carbon microfibers are made by immersing commercially available carbon fibers in an intercalating acid solution comprising approximately 60% fuming nitric acid and 40% sulfuric acid at a temperature of approximately 85° C. for a period of time in excess of 60 minutes to loosen the intercrystallite bonds between the graphitic planes. The carbon microfibers are separated from the primary fibers by gently stirring the intercalating acid solution. The separated microfibers are then filtered out of the solution and washed to remove the residual acid. The separated microfibers are then dispersed in the neat resin used to impregnate the interstices of the continuous fiber in the fabrication of the continuous fiber composite. The composite is made using conventional methods with the carbon microfibers randomly dispersed between the interstices of the primary fibers.

One advantage of having the carbon microfibers dispersed in the interstices of the continuous primary fibers is significant increase in the transverse properties of the composite. Another advantage is that the microfibers may be made from scrap or chopped carbon fibers.

These and other advantages of the invention will become apparent from a reading of the following detailed description of the invention and the method for making the carbon microfibers.

DETAILED DESCRIPTION OF THE INVENTION

Figure 1:
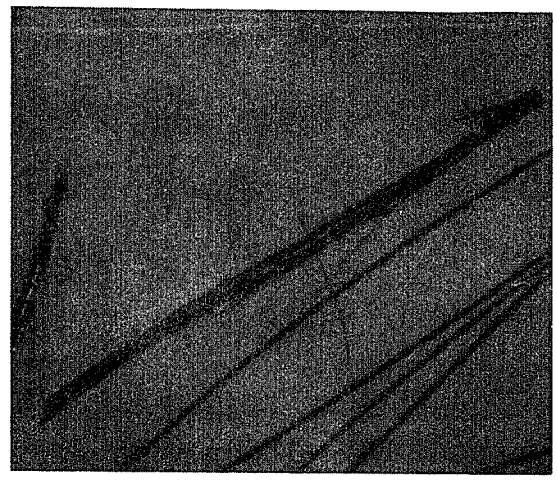
FIG. 1 is a microphotograph showing the onset of the fiber breakup after being immersed in the intercalating acid solution for 30 minutes.

Commercially available carbon fiber is typically about 8 microns in diameter. In this respect, carbon fibers are not unlike other reinforcing fibers used in composite materials. However, unlike most other reinforcing fibers, such as glass, carbon fiber possesses a complex internal structure that contributes to its outstanding physical properties in the direction parallel to the fiber axis.

This structure has been elucidated by numerous workers in the field. A comprehensive review of the carbon fiber structure is presented by Reynolds in *Chemistry and Physics of Carbon,* Volume II, Dekker New York 1973. Briefly, the carbon fiber structure consists of ribbon or fibrillar crystallites that twist, intertwine, and undulate along the longitudinal axis of the fiber. The substructure of the ribbon or fibrillar crystallites is composed of aligned graphitic planes. These crystallites may only be a few planes in thickness, but extend for hundreds of angstroms along the fiber axis.

High temperature heat treatment of the carbon fibers will improve the alignment of the fibers, reduce undulations of the ribbons, and substantially increase the longitudinal fiber modulus. The degree to which these benefits are obtained depends to a large part upon the heat treatment as disclosed by W. Watts and W. Johnson in the Proceedings of the 3rd International Conference on Industrial Carbons and Graphite, London 1970, page 417.

The high degree of crystal alignment in ultra-high modulus fibers results in relatively low tensile properties transverse to the fiber axis due to weak Van der- Waals bonding between basal planes and reduced interlocking. Therefore, it is reasonable to expect that such fibers would split along the crystallite boundries into smaller particles having sufficiently high aspect ratios and small diameters to qualify as microfibers. Moreover, if the crystallites themselves were separated from larger fibers, their physical properties would approach theoretical limits.

In accordance with the above analysis, a method has been developed to produce carbon microfibers small enough to fit into the interstices between the primary fibers of a continuous fiber composite. The method comprises immersing the carbon fibers in a solution of two or more strong intercalating acids to weaken and disrupt the intercrystallite bonding between the aligned graphitic planes. Mechanical agitation of the immersed fibers separates the crystallites whose inter-crystallite boundries are weakened by the combination of intercalating acids from the immersed fibers. The residue of the carbon fibers is removed from the solution then the acid solution is diluted with water. The carbon microfibers are then separated from the diluted solution by filtering. Repeated washing and filtering steps are used to remove the residual acid from the separated microfibers.

A preferred solution of strong intercalating acid comprises a mixture of 50 to 70 percent fuming nitric acid and 30 to 50 percent sulfuric acid and in particular a mixture containing 60 percent fuming nitric acid and 40 percent sulfuric acid (95% aq.) at a temperature of 85° C.

Figure 2:
FIG. 2 is a microphotograph of the intercalating solution after 90 minutes showing the separated microfibers.
Figure 3:
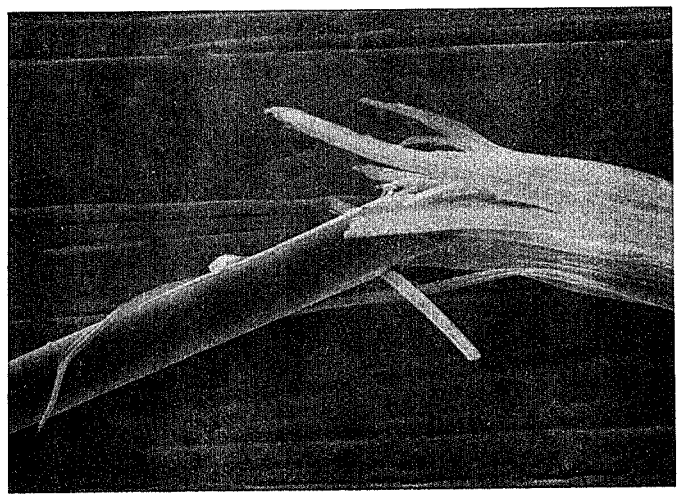
FIG. 3 is a photograph taken with a scanning electron microscope illustrating how the breakup of large carbon fiber gives rise to the various sizes and shapes of the microfibers produced by the disclosed method.

As an example of the process, high modulus pitch-based carbon fiber, such as Union Carbide P300 carbon fibers made by Union Carbide Corporation of New York, N.Y. was immersed in a mixture of 60% fuming nitric acid ($HNO_3$) and 40% sulfuric acid ($H_2SO_4$, 95% aq.) at 85° C. Gentle stirring action was employed to agitate the fibers and separate the microfibers from the immersed fibers. After 30 minutes a sample of the fibers was extracted and observed under a microscope. As illustrated in FIG. 1, which is a microphotograph of the withdrawn sample taken at 180× magnification, the onset of the fiber breakup is discernible. In particular one of the central fibers has become enlarged and splintering microfibers are clearly visible. With further treatment in the intercalating solution the carbon microfibers separate from the base fibers and float free in the solution as illustrated in FIG. 2. FIG. 2 is a microphotograph of the solution taken 90 minutes after the carbon fibers were immersed in the solution of intercalating acids and shows the large quantity of high aspect ratio of carbon microfibers produced. A closer inspection of the splintering fibers using a scanning electron microscope is illustrated in FIG. 3. This photograph was taken at a magnification of 1.31K× and more clearly shows how the various sizes and shapes of microfiber are produced by this method. These microfibers may be round, irregular or flat ribbons ranging from tenths of a micron to several microns in cross section.

As previously indicated the microfibers may be separated from the solution by filtering. Repeated washings are used to remove the residual intercalating acid solution prior to incorporating them into continuous fiber composites.

One advantage of this method for making carbon microfibers is that they may be produced at relatively low cost using scrap or chopped carbon fibers.

In the fabrication of the continuous fiber composite material the separated carbon microfibers are dispersed in the resin material prior to impregnating the continuous fibers. The continous fiber composite is made using the resin having the dispersed microfibers. As the primary fibers are impregnated with the resin, the carbon microfibers become randomly dispersed in the interstices significantly enhancing the transverse properties of the composite.

Although the invention has been described using carbon fibers and a particular combination of intercalating acids, those skilled in the art will recognize that the disclosed method is equally applicable to other materials and that other intercalating acids may be used to weaken the intercrystallite boundaries within the spirit of the invention as described herein and set forth in the appended claims.

What is claimed is:

1. A method for making carbon microfibers comprising the steps of:
    immersing carbon fibers in an intercalating acid solution to weaken the intercrystal bonds betwen the crystallite planes of the carbon fibers;
    stirring said intercalating acid solution with the immersed carbon fibers to separate the weakened crystallite planes from the carbon fibers to form carbon microfibers;
    filtering said intercalating acid solution to separate said carbon microfibers from the acid solution: and
    rinsing said separated carbon microfibers to remove the residual intercalating acid.

2. The method of claim 1 wherein said intercalating acid solution is a mixture of nitric acid and sulfuric acid.

3. The method of claim 2 wherein said mixture comprises 50 to 70 percent fuming nitric acid and the remainder sulfuric acid at a temperature between 80° C. and 90° C.

4. The method of claim 2 wherein said mixture comprises 60 percent fuming nitric acid and 40 percent sulfuric acid at a temperature of 85° C.

* * * * *